US006955247B2

(12) United States Patent
Renauld

(10) Patent No.: US 6,955,247 B2
(45) Date of Patent: Oct. 18, 2005

(54) DISC BRAKE, IN PARTICULAR FOR A MOTOR VEHICLE, PAD FOR SUCH A BRAKE AND ANTI-NOISE SHIM FOR SUCH A PAD

(75) Inventor: Laurent Renauld, Freniches (FR)

(73) Assignee: Federal Mogul Friction Products SAS, Noyon (FR)

( * ) Notice: Subject to any disclaimer, the term of this patent is extended or adjusted under 35 U.S.C. 154(b) by 0 days.

(21) Appl. No.: 10/459,570

(22) Filed: Jun. 12, 2003

(65) Prior Publication Data

US 2004/0035651 A1 Feb. 26, 2004

(30) Foreign Application Priority Data

Jun. 13, 2002 (FR) ............................................ 02 07276

(51) Int. Cl.[7] ................................................ F16D 65/38

(52) U.S. Cl. ............................... 188/73.37; 188/73.36; 188/250 E

(58) Field of Search ......................... 188/250 E, 250 B, 188/250 C, 73.37, 73.35, 73.36

(56) References Cited

U.S. PATENT DOCUMENTS 4,533,025 A 8/1985 Carre
4,823,920 A 4/1989 Evans
5,499,696 A * 3/1996 Kobayashi et al. ..... 188/1.11 W
5,509,508 A * 4/1996 Evans ..................... 188/73.38
5,816,370 A 10/1998 Verbeeten et al.
5,842,546 A * 12/1998 Biswas .................... 188/73.37
6,116,384 A * 9/2000 Matsumoto et al. ..... 188/73.31
6,170,620 B1 1/2001 Akita et al.
6,283,258 B1 * 9/2001 Chen et al. ............. 188/250 E

FOREIGN PATENT DOCUMENTS

DE 199 12 957 10/2000
GB 2 115 507 9/1983

* cited by examiner

*Primary Examiner*—Matthew C. Graham
(74) *Attorney, Agent, or Firm*—Young & Thompson

(57) ABSTRACT

Disc brake comprising two pads each intended to cooperate with a lateral face of the disc to be braked under the action of control element comprising an axially mobile piston, parallel to the disc axis, in a caliper straddling the disc. The piston cooperates according to a support zone with the pad facing it. The pad includes a metal support carrying a friction lining. The support is symmetrical to a transverse plane of symmetry, which is perpendicular to it and which is parallel to the disc axis, the piston axis being displaced with respect to said plane of symmetry by being at a transverse distance therefrom. An anti-noise shim is arranged between the piston and the support and provided with an opening arranged at right angles with the piston support zone: the anti-noise shim carries another opening, the openings being arranged symmetrically with respect to said plane of symmetry.

10 Claims, 2 Drawing Sheets

DISC BRAKE, IN PARTICULAR FOR A MOTOR VEHICLE, PAD FOR SUCH A BRAKE AND ANTI-NOISE SHIM FOR SUCH A PAD

BACKGROUND OF THE INVENTION

The present invention relates to disc brakes, in particular for motor vehicles.

A disc brake, in particular for a motor vehicle, comprises two pads, each intended to cooperate with a lateral face of the disc to be braked under the action of means of control.

These means of control generally comprise a piston mounted so that it is axially mobile, parallel to the disc axis, in a caliper adapted to straddle the disc; the piston is adapted to cooperate with the pad facing it, according to a zone called support zone.

Each pad is constituted by a metal support carrying a friction lining, said metal support being symmetrical with respect to a plane called plane of symmetry, which is perpendicular to it and which is parallel to the disc axis.

It is known that by de-centering the point of application of the braking force due to the piston, i.e. therefore by displacing the piston axis with respect to said plane of symmetry, by arranging it at a transverse distance from the latter, the wear on the friction lining is evened out, parallel to the plane of the metal support, which makes it possible to achieve the maximum benefit from the wear volume of the friction lining.

It is also known that a displacement as above makes it possible to resolve, in certain applications, the problems of noise linked with the rubbing of the friction lining against the facing material, namely the disc to be braked.

Of course these displacements are different; the first being linked with the brake itself, which leads to its being modified by arranging, between the piston and the metal support, an anti-noise shim provided with an opening, said opening, when the pad is mounted in the brake, being found to be arranged at right angles with the piston support zone.

The anti-noise shim being advantageously fixed to the metal support, for example by bonding, it is understood that this requires the arrangement of two different pads for the brakes placed on the left or right with respect to the longitudinal plane of symmetry of the vehicle in question, in particular when the disc brake is of the floating caliper type, the inner pad then being subjected to the action of the piston and the outer pad to the reaction of the caliper integral with the cylinder in which the piston moves; this is also true when the caliper is of the fixed type, each pad being subjected to the action of a piston, the two pistons moving in cylinders arranged in the caliper on either side of the disc.

SUMMARY OF THE INVENTION

The invention has the objective of avoiding these disadvantages, by proposing a pad, equipped with an anti-noise shim, which can be mounted equally well in a disc brake arranged on the left or right of a vehicle.

According to the invention, a disc brake of the above type is characterized by the fact that the anti-noise shim has another opening, the two openings being arranged symmetrically with respect to said plane of symmetry.

Advantageously, when the first opening is at right angles with the piston support zone, the second opening is situated outside this piston support zone.

Preferably, the piston support zone is ring-shaped; the openings are oblong and curved.

Advantageously, positioning means are provided in order to position the anti-noise shim with respect to the metal support of the pad; these positioning means are complementary tapered shapes.

Preferably, fixing means are provided for fixing the anti-noise shim on the metal support; these fixing means include pins carried by the metal support.

Advantageously, the caliper is of the floating type.

As a variant, the caliper is of the fixed type.

A subject of the invention is also a pad intended for a disc brake as above, constituted by a metal support carrying a friction lining, said metal support being symmetrical with respect to a transverse plane called plane of symmetry and carrying an anti-noise shim provided with an opening: said anti-noise shim is provided with a second opening, said openings being arranged symmetrically with respect to said plane of symmetry.

A subject of the invention is also an anti-noise shim for such a pad, said shim comprising two openings arranged symmetrically with respect to the plane of symmetry.

BRIEF DESCRIPTION OF THE DRAWINGS

The characteristics and advantages of the invention are moreover made clear by the description which follows, by way of example, with reference to the attached drawings, in which.

DESCRIPTION OF THE PREFERRED EMBODIMENTS

Figure 3:
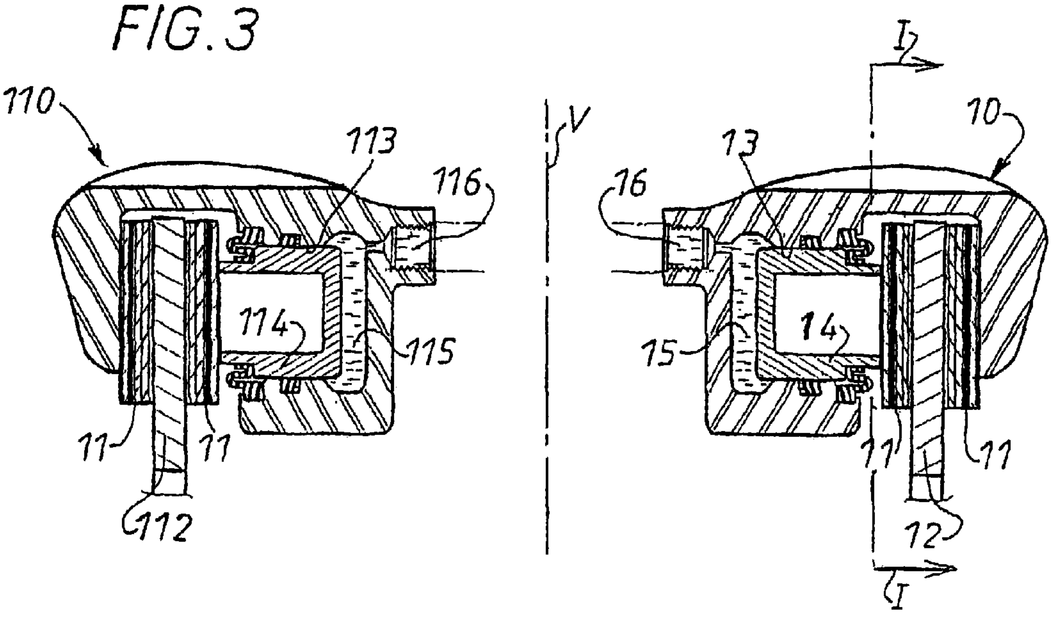
FIG. 3 is a partial sectional view showing the two brakes, left and right, of the same motor vehicle axle.
Figure 4:
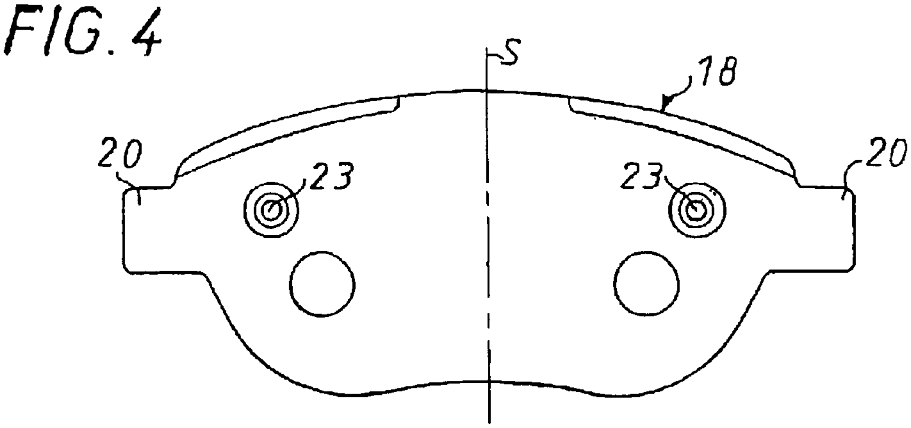
FIG. 4 is a plan view of the metal support only of the pad in FIGS. 1 and 2.
Figure 5:
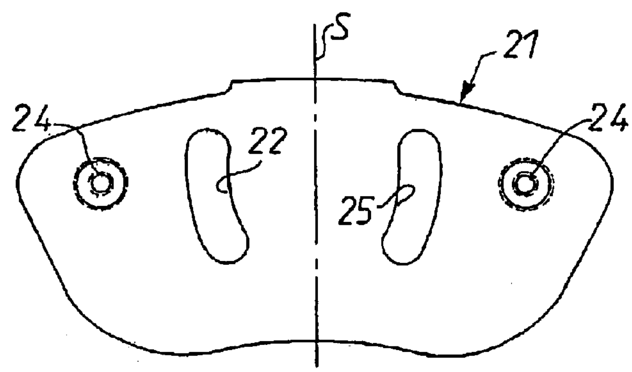
FIG. 5 is a plan view of the anti-noise shim only of the pad in FIGS. 1 and 2.

With reference to the figures, a disc brake, in particular for a motor vehicle, comprises a caliper 10, FIG. 3, adapted to straddle the disc 12 to be braked; two pads 11 each cooperate with a lateral face of the disc towards which they are pushed under the action of means of control.

These means of control are here of the hydraulic type and comprise a blind cylinder 13, fitted in the caliper 10, in which a hollow piston 14 with a ring-shaped cross-section is mounted, in a sliding fashion; the base of the cylinder 13 and the base of the piston 14 delimit a chamber with a variable volume 15 communicating with a supply port 16 linked to a supply line for a fluid under pressure.

The caliper 10 straddles the disc 12 so that, when the chamber 15 is pressurized, the piston 14 pushes towards the disc 12 the pad 11 interposed between the piston 14 and the corresponding face of the disc 12, and the cylinder 13, therefore the caliper 10, is moved in the opposite direction and applies the other pad 11 to the other face of the disc 12.

Here the caliper 10 is therefore of the floating type and the pads 11 are carried by a fixed yoke 17 adapted to receive the overall tangential reaction forces due to the braking torque.

The pad 11 is constituted by a metal support 18 carrying a friction lining 19.

The metal support 18 is provided with lateral ears 20 by which it is carried by the yoke 17, being mounted in a sliding fashion therein.

The pad 11 and the yoke 17 have a symmetrical arrangement with respect to a plane called plane of symmetry, the line of which is shown as S in the figures, this plane being perpendicular to the plane of the metal support 18 and parallel to the disc axis 12.

The hollow of the hollow piston 14 being open towards the disc 12, the piston 14 acts on the metal support 18 by its front, ring-shaped rim, and its support zone on said metal support corresponds to the part of its ring-shaped rim in contact therewith.

In order that the wear on the friction lining 19 should be even, parallel to the face facing the disc 12, the force of application of the piston 14 on the metal support 18 is displaced towards the front of the vehicle; in order to do this, the caliper 10 is mounted and guided on the yoke 17 so that the axis of the piston 14 is in a plane displaced with respect to the plane of symmetry S by a quantity d, the line of this displaced plane being referenced by U in the figures.

In order to resolve noise problems, the force of application of the piston 14 is also displaced, in particular also towards the front of the vehicle.

In order to do this, an anti-noise shim 21 is arranged between the piston 14 and the metal support 18, said anti-noise shim 21 being provided with an opening 22 arranged at right angles with the support zone on the metal support 18 of the piston 14.

Here, the support zone being ring-shaped, the opening 22 is an oblong, curved opening.

Thus, thanks to this arrangement, the force of application of the piston 14 on the metal support 18 is in a plane, the line of which referenced by B, displaced with respect to the plane S by a quantity greater than d.

In such a way as to constitute a sub-assembly, the anti-noise shim 21 is integral with the metal support 18; this integration can be achieved by bonding; here, the metal support 18 has on its face facing the piston 14 pins 23, here two pins 23, emerging from the base of tapering cavities.

These tapering cavities receive lances 24 of corresponding shape, arranged in the anti-noise shim 21 and pierced with holes adapted to receive the pins 23; thus, the anti-noise shim 21 is positioned with respect to the metal support 18 and fastened.

FIG. 3 shows diagrammatically the two brakes of the same axle of a motor vehicle: the right brake, described succinctly above, and the left brake, of which the pieces playing the same role carry the same reference as the corresponding pieces of the right brake, increased by 100.

When such a pad 11 equipped with such an anti-noise shim 21 provided with the opening 22, designed to be arranged between the piston 14 and the disc 12 of the brake in the right-hand section of FIG. 3, is placed between the piston 114 and the disc 112 of the brake in the left-hand section of FIG. 3, said brake being arranged symmetrically with respect to the preceding one, and to the transverse plane T of the vehicle, the displacing of the pressure force of the piston is not in the correct direction; in order that it is, the anti-noise shim 21 must be turned over before being fixed to the metal support 18, which leads to two different pads.

In order to avoid this, the invention provides for the anti-noise shim to be provided with a second opening 25.

Figure 1:
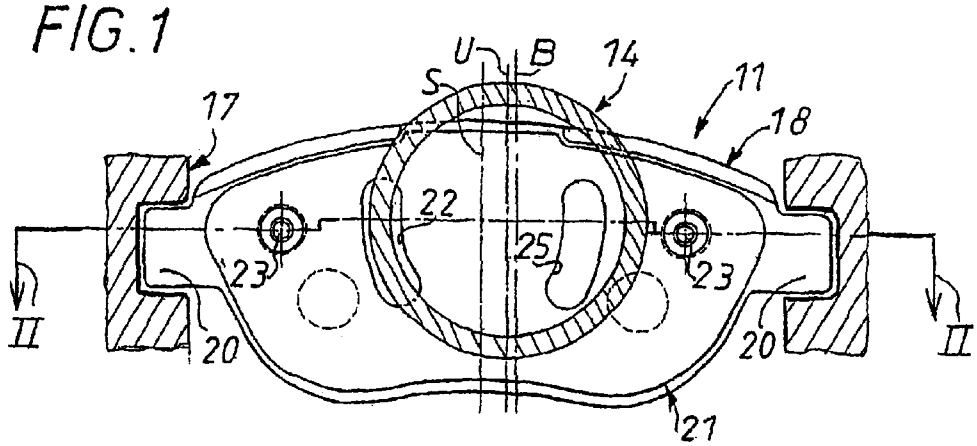
FIG. 1 is a partial sectional view of a disc brake according to the invention according to I—I in FIG. 3.
Figure 2:
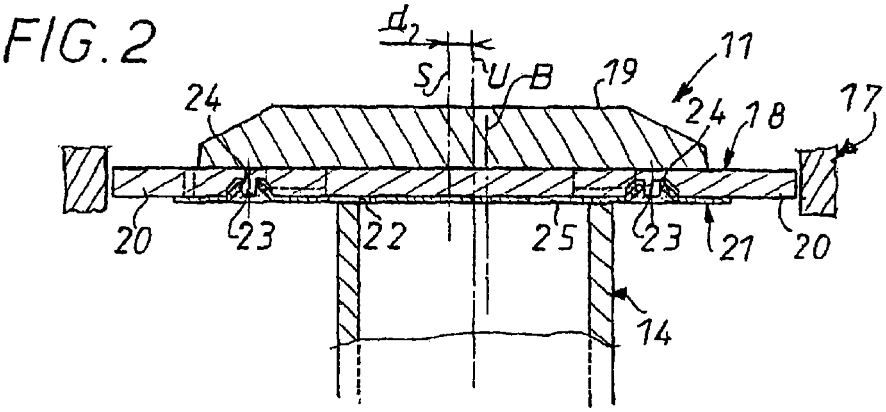
FIG. 2 is a sectional view according to II—II in FIG. 1.
Figure 6:
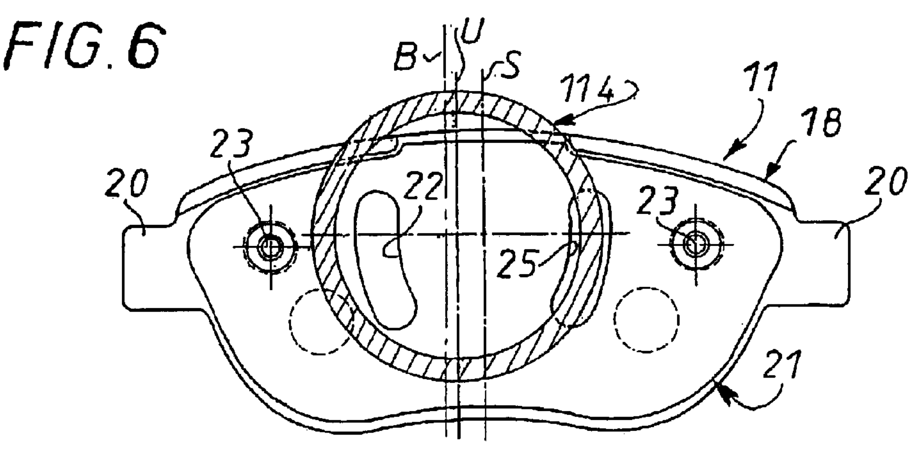
FIG. 6 is a view analogous to FIG. 1 and corresponds to the other brake of the same axle as that of the brake in FIG. 1.

This second opening 25 and the first opening 22 are arranged symmetrically with respect to the plane of symmetry S; advantageously, when the first opening 22 is at right angles with the piston support zone 14, the second opening 25 is situated outside this piston support zone 14; thus, when this same pad 11 is mounted in the left brake, it is the opening 25 which is at right angles with the piston support zone 114, the opening 22 being outside this zone; the point of application of the force of the piston is then displaced in the same direction with respect to the vehicle, as much in the right brake as in the left brake, as can be seen in FIGS. 1 and 6.

Of course, this applies when the disc brake is of the fixed caliper type: in this case, the yoke 17 and the caliper are integral and each pad is associated with a piston, on either side of the disc.

What is claimed is:

1. A disc brake for a motor vehicle, comprising:

two pads (11) each intended to cooperate with a lateral face of a disc (12,112) to be braked under the action of only one piston (14,114) mounted so that it is axially mobile, parallel to an axis of the disc (12,112), in a caliper (10,110) adapted to straddle the disc (12,112), said one piston (14,114) being adapted to cooperate at a support zone with one of the pads (11) facing it, each of said pads (11) comprising a metal support (18) carrying a friction lining (19), said metal support (18) being symmetrical with respect to a transverse plane of symmetry, which is perpendicular to it and which is parallel to the disc axis (12,112), the piston axis (14,114) being displaced with respect to said plane of symmetry by being at a transverse distance (d) from the latter, an anti-noise shim (21) being arranged between said one piston (14,114) and the metal support (18) and provided with a first opening (22) arranged at right angles with the piston support zone (14,114), wherein said first opening is adapted to displace a force of application of said one piston with respect to said plane of symmetry by a quantity greater than said transverse distance, and wherein the anti-noise shim (21) has a second opening (25), the first and second openings (22,25) being arranged symmetrically with respect to said plane of symmetry.

2. The disc brake according to claim 1, wherein when the first opening (22) is at the piston support zone (14,114), the second opening (25) is situated outside the piston support zone (14,114).

3. The disc brake according to claim 1, wherein the piston support zone (14,114) is ring-shaped.

4. The disc brake according to claim 3, wherein the first and second openings (22,25) are each oblong and curved.

5. The disc brake according to claim 1, further comprising positioning means (24) for positioning the anti-noise shim (21) with respect to the metal support (18) of the pad (11).

6. The disc brake according to claim 5, wherein said positioning means (24) are complementary tapering shapes.

7. The disc brake according to claim 1, further comprising fixing means (23) for fixing the anti-noise shim (21) on the metal support (18).

8. The disc brake according to claim 7, wherein said fixing means include pins (23) carried by the metal support (18).

9. The disc brake according to claim 1, wherein the caliper (10,110) is of the floating type.

10. The disc brake according to claim 1, wherein the caliper is of the fixed type.

* * * * *